(12) United States Patent
Picchioni et al.

(10) Patent No.: US 11,041,059 B2
(45) Date of Patent: Jun. 22, 2021

(54) METHOD FOR RECLAIMING RUBBER, AND RENEWED RUBBER COMPOSITIONS OBTAINABLE THEREBY

(71) Applicant: RIJKSUNIVERSITEIT GRONINGEN, Groningen (NL)

(72) Inventors: Francesco Picchioni, Groningen (NL); Antonius Augustinus Broekhuis, Groningen (NL)

(73) Assignee: Rijksuniversiteit Groningen, Groningen (NL)

(*) Notice: Subject to any disclaimer, the term of this patent is extended or adjusted under 35 U.S.C. 154(b) by 24 days.

(21) Appl. No.: 16/461,918

(22) PCT Filed: Nov. 17, 2017

(86) PCT No.: PCT/NL2017/050746
§ 371 (c)(1),
(2) Date: May 17, 2019

(87) PCT Pub. No.: WO2018/093260
PCT Pub. Date: May 24, 2018

(65) Prior Publication Data
US 2019/0276633 A1    Sep. 12, 2019

(30) Foreign Application Priority Data
Nov. 18, 2016    (EP) .................... 16199584

(51) Int. Cl.

| | | |
|---|---|---|
| *C08J 11/12* | (2006.01) | |
| *B29B 7/02* | (2006.01) | |
| *B29B 7/90* | (2006.01) | |
| *C08J 11/20* | (2006.01) | |
| *C08L 21/00* | (2006.01) | |
| *C08J 11/10* | (2006.01) | |
| *C08L 19/00* | (2006.01) | |
| *C08J 11/28* | (2006.01) | |
| *C08C 19/08* | (2006.01) | |
| *B29K 9/00* | (2006.01) | |
| *B29K 105/26* | (2006.01) | |
| *B60C 1/00* | (2006.01) | |
| *E01C 7/26* | (2006.01) | |
| *E04F 15/00* | (2006.01) | |
| *B29B 17/04* | (2006.01) | |

(52) U.S. Cl.
CPC .............. *C08J 11/12* (2013.01); *B29B 7/02* (2013.01); *B29B 7/90* (2013.01); *C08C 19/08* (2013.01); *C08J 11/10* (2013.01); *C08J 11/20* (2013.01); *C08J 11/28* (2013.01); *C08L 19/003* (2013.01); *C08L 21/00* (2013.01); *B29B 17/0404* (2013.01); *B29K 2009/00* (2013.01); *B29K 2105/26* (2013.01); *B60C 1/00* (2013.01); *C08J 2319/00* (2013.01); *C08J 2321/00* (2013.01); *E01C 7/265* (2013.01); *E04F 15/00* (2013.01); *Y02W 30/62* (2015.05)

(58) Field of Classification Search
USPC ........................................ 521/44.5
See application file for complete search history.

(56) References Cited

U.S. PATENT DOCUMENTS 6,590,042 B1    7/2003    Tang

FOREIGN PATENT DOCUMENTS

WO    02094917 A1    11/2002
WO    2014084727 A1    6/2014

*Primary Examiner* — Terressa Boykin
(74) *Attorney, Agent, or Firm* — Verrill Dana, LLP

(57) ABSTRACT

A method for reclaiming rubber comprises the steps of: (i) providing a starting material comprising a vulcanized rubber polymer; (ii) subjecting the starting material to mechanical stress and at a temperature of at least 200° C. to achieve at least a partial destruction of the cross-links and the backbone structure of the rubber polymer into fragments; and (iii) reconstituting at least part of the fragments in the presence of a branching/grafting agent to obtain a renewed rubber composition.

28 Claims, 19 Drawing Sheets

Scheme 2

METHOD FOR RECLAIMING RUBBER, AND RENEWED RUBBER COMPOSITIONS OBTAINABLE THEREBY

Figure 1:
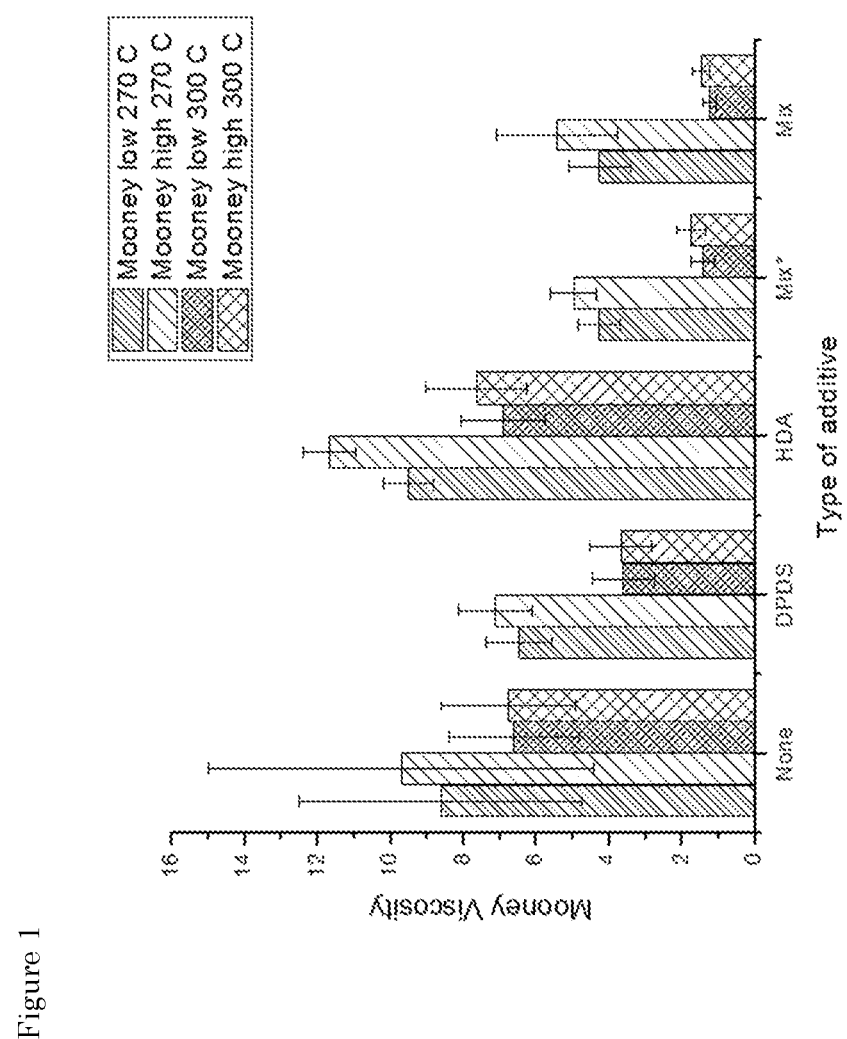

The invention relates to the recycling of used rubber products, more specifically to the recycling of Ground Tire Rubber (GTR) from cars and trucks.

Used rubber products (at the end of their lifetime) are nowadays either burned for energy purposes, or ground to fine particles to be subsequently incorporated, for example, in polymeric resins. A small fraction of rubber products, usually those consisting of a single rubber component, can be efficiently reclaimed and/or devulcanized in order to produce a high-quality recycled rubber material further to be mixed with the virgin component. During devulcanization, the sulphur based crosslinking points between the chains are almost selectively broken in the process to allow the rubber to be re-processed, while the carbon based backbone should not be affected. See for example WO2014/084727, disclosing a method of devulcanizing a rubber vulcanizate of main chains and sulfur-containing cross-links. The method comprises treating the rubber vulcanizate with a devulcanizing agent at a temperature and concentration sufficient to cause the devulcanizing agent to react with the sulfur-containing cross-links while only slightly reacting with the backbone. See the publications by Sutanto et al. (Int. Polym. Proc., 2, 211-217 (2006); Chem. Eng. Sci., 61, 7077-7086 (2006); J. Appl. Pol. Sci., 102, 5028-5038 (2006) J. Appl. Pol. Sci., 102, 5948-5957 (2006)). Patent literature on processes involving de-vulcanization approaches include U.S. Pat. No. 6,590,042 and WO02/094917.

Thus, conventional devulcanization in principle involves destroying/de-crosslinking the rubber network structure and make the product re-workable. However, while it might work for products containing one single polymeric material, it is still not 100% selective, as not only the crosslinking points are destroyed but also the backbone. This is particularly crucial for a mixture of rubbers, as is used for tires. The presence of different polymeric materials makes it factually impossible, at least for industrial purposes, to find experimental conditions where all crosslinking points are broken and while none of the backbones are unaffected.

Ground Tire Rubber (GTR) from car (and possibly truck) tires are particularly technically difficult to recycle. This is due to the presence of at multiple, typically at least 4, different rubber components in GTR that are characterized by different devulcanization conditions and thermal stability. Because of these different characteristics in the rubber components in GTR, degradation of the carbon backbone occurs in part of the rubber components, since the processing parameters are only optimal for some but not for other rubber components in GTR. Due to this partial degradation of the carbon backbone of the rubber by conventional devulcanization, the viscosity of devulcanized/reclaimed rubber is much lower than original blends, causing major problems in mixing with virgin components. Also, conventional devulcanization methods are not suitable for recycling peroxide-crosslinked rubber. As a result, the amount of recycled rubber in the new material is limited to approximately only 10%. More in particular, these limitations make it at present impossible to recycle car tires in an efficient way. Attempts to devulcanize under mild conditions (e.g. biological processes) have been successful but employ conditions (e.g. use of solvents) rendering them not applicable at industrial level.

The present inventors therefore set out to develop new means and methods for the reclaiming of all types of rubber (mixtures) into renewed rubber products. More specifically, they aimed at improving the recycling process for rubber blends, such as those present in car and truck tires, into a high quality recycled material.

Walking completely off the beaten track, they surprisingly observed that the above goals can be met by the thermal fragmentation of both the crosslinks and backbone of the rubber network, e.g. by means of high shear and temperature and possibly with the aid of specific chemicals, followed by recombination of the corresponding fragments through the use of specific chemicals, herein also referred to as 'branching/grafting agents". These two stages are conveniently carried out in a one-pot process. The net result of this invention is a recycled/reclaimed product whose viscosity can be finely tuned according to the processing steps up to the level of that of the virgin components.

Accordingly, in one embodiment the invention provides a method for reclaiming rubber, comprising the steps of
(i) providing a starting material comprising a vulcanized rubber polymer;
(ii) subjecting the starting material to mechanical stress and at a temperature of at least 200° C. to achieve at least a partial destruction of the cross-links and the backbone structure of the rubber polymer into fragments; and
(iii) reconstituting at least part of the fragments in the presence of a reclaiming agent to obtain a renewed rubber composition.

The concept underlying the present invention is depicted in Scheme 1.

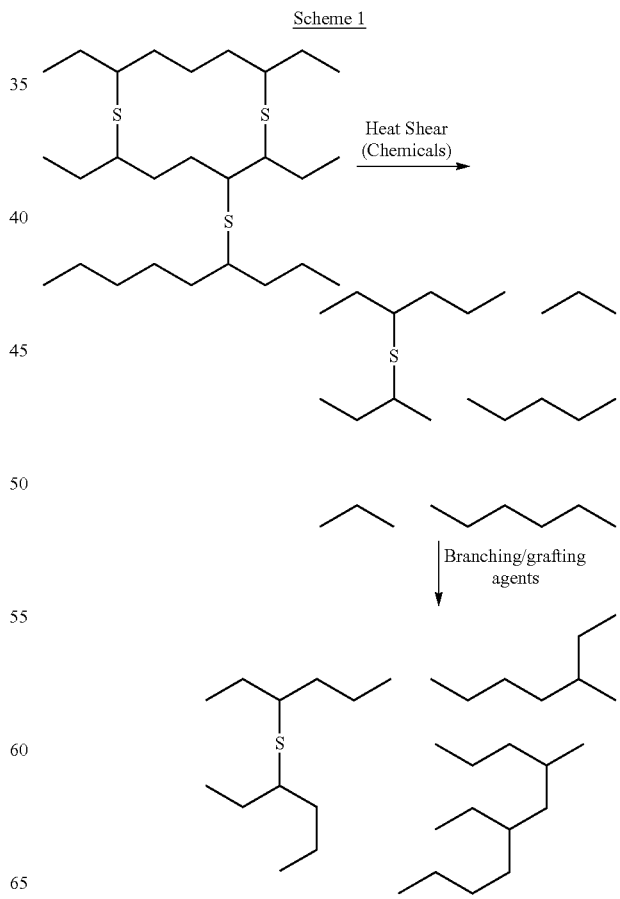

Scheme 1

Step (i) of a method provided herein, leading to disruption of the rubber network, comprises providing a starting material comprising any type of crosslinked (by sulphur and/or peroxide) rubber polymer. In one embodiment, it comprises a rubber vulcanizate. Vulcanization is the process by which rubber macromolecules are cross-linked with each other by using sulfur or radical initiators. The cross-linked chains create a three-dimensional network of rubber. Preferably, the starting material for use in the present invention comprises a blend or mixture of two or more distinct vulcanized rubbers, like three different rubber ingredients or even four. The method advantageously employs ground tire rubber (GTR) from car tires and/or truck tires as starting material, preferably GTR from car tires.

A method according to the invention is characterized among others by inducing a partial breakdown (disruption/fragmentation) of the rubber network (both the cross-links and the backbone structure) into fragments. This is achieved by subjecting the starting material to mechanical stress and an elevated temperature, more in particular by heating the starting material to a temperature of at least 200° C., preferably at least 220° C., more preferably at least 250° C. or even above 270° C. In one aspect, the starting material is subjected to a temperature of about 300° C.

The fragmentation step can be performed in any appropriate equipment provided that the necessary process conditions (mechanical stress, elevated temperature) are met. For example, it can be carried out using a batch process, for example using a Brabender batch mixer, or a continuous one e.g. using an extruder. Batch mixing is commonly used for compounding and mixing of rubber formulations. It is generally carried out using two specially designed blades inside a temperature controlled chamber. The heating period may vary depending on circumstances, and can range from 1 to 10 minutes in a batch process.

In a preferred embodiment, fragmentation step (ii) is performed under mixing using in high-shear mixing equipment, preferably an extruder. Good results are obtained at a speed of at least 50 rpm, preferably at least 80 rpm and/or during a mixing period at 1-60 minutes, preferably 1-20 minutes. For example, twin screw extrusion is suitably used for mixing and reacting the polymeric materials. The flexibility of twin screw extrusion equipment allows this operation to be designed specifically for the formulation being processed. For example, the two screws may be co-rotating or counterrotating, intermeshing or non-intermeshing. In addition, the configurations of the screws themselves may be varied using forward conveying elements, reverse conveying elements, kneading blocks, and other designs in order to achieve particular mixing characteristics. In a specific aspect, a co-rotating double screw extruder is used (see for example FIG. 13), allowing for a residence time of only 4-6 minutes. Suitable screw speeds for use in the present invention are in the range of 75-150 rpm, preferably 80-120 rpm.

According to the invention, the fragmentation step can be performed in the presence or the absence of a de-curing additive, herein also referred to as "fragmentation additive". In one embodiment, step (ii) is performed in the presence of a fragmentation additive. Suitable fragmentation additives are known in the art. See for example the references by Sutanto et al. mentioned herein above, or WO2014/084727. In one aspect of the invention, the fragmentation/de-curing additive is selected from hexadecyl amine (HDA), diphenyldisulfide (DPDS) (optionally in the presence of treated distillate aromatic extracts (TDEA)) and any combination thereof. Other preferred fragmentation additives are radical initiators or other polymers, such as PP (polypropylene) and SEBS (hydrogenated triblock copolymer styrene-butadiene-styrene). Both polymers are known to give thermal degradation above 200° C. (and especially above 250° C.), thereby generating radicals that can in turn help the network disruption. See Examples 5, 7 and 8 herein below.

Thus, in one embodiment the process is carried out in batch or in an extruder, at a temperature above 200° C., most preferably above 250° C. in the presence of a fragmentation additive that generates free radicals in the system and thus accelerates the network disruption.

The fragmentation/de-curing additive is typically used at a concentration in the range of about 0.1-20 wt %, preferably about 0.5-10 wt %, more preferably 1-7 wt %, based on the total dry weight of the rubber material. In a specific aspect, about 5 wt % of SEBS or PP is used.

However, in another preferred embodiment, step (ii) is performed in the absence of a de-curing/fragmentation additive, typically accompanied by correspondingly increasing temperature and shear stress of the process. Hence, in one aspect the invention provides a method for reclaiming rubber which method does not comprise the use of a de-curing additive like DPDS or HDA. The step of network destruction is suitably carried out in an extruder at a temperature above 200° C., preferably above 250° C. and more preferably above 270° C., in the absence of any auxiliary agent. See Example 5.

Step (iii) of a method of the invention comprises partial reconstitution of the fragments obtained in the destruction/fragmentation step to obtain a renewed rubber composition, which reconstitution is achieved by the presence of a reclaiming agent used in an amount effective to obtain grafted and/or branched structures while avoiding crosslinking.

The reclaiming agent is herein also referred to "non-crosslinking branching/grafting agent" or briefly "branching/grafting agent". This second step is crucially not a crosslinking one (at least crosslinking does not take place in a prominent way) as it delivers a product with very low crosslinking density and a ultra-high soluble fraction (in acetone and THF) close to the maximum limit based on the composition of the GTR (excluding thus additives such as carbon black and the bound rubber). At a macroscopic level, the grafting/branching agent allows tuning the viscosity of the product to the desired level depending on the reaction time (e.g. the residence time in the extruder or part thereof), kind and amount of chemicals without significantly affecting the soluble fraction. Hence, step (iii) of reconstituting at least part of the fragments is performed in the presence of a branching/grafting agent to obtain a renewed rubber composition.

Preferably, the grafting/branching agent comprises a plurality unsaturated moieties capable of reacting with free radicals, preferably wherein said moieties are selected from —C=C— and C=O. In one aspect, the grafting/branching agent is of the general structure F'—R—F", wherein each of F' and F" is an unsaturated moiety capable of reacting with free radicals, preferably independently selected from —C=C— and C=O; and wherein R is an alkylic or aromatic organic moiety, either alkylic or aromatic or any combination thereof.

In one embodiment, the grafting/branching agent is a bifunctional agent, typically of low molecular weight. Preferably said bifunctional grafting/branching agent is a substituted or unsubstituted bifunctional agent with C double bonds being the main functional groups, for example it is selected from the group consisting of substituted or unsubstituted hydroquinone (HDQ), substituted or unsubstituted divinylbenzene (DVB), and substituted or unsubstituted bismaleimides. In a preferred embodiment, the bifunctional agent is DVB.

In another embodiment, the grafting/branching agent is a polymeric (i.e. multifunctional) agent comprising multiple F moieties attached to a polymeric backbone, F being an unsaturated moiety capable of reacting with free radicals, preferably independently selected from —C═C— and C═O. In case of a multifunctional agent, the net result is a thermoplastic rubber that, in principle, does not need to be re-cross-linked for applications.

Suitable polymeric grafting/branching agents for use in the present invention include co-polymers of the type A-B-A, wherein each of A and B is independently selected from the group of homo- and or co-polymers of styrene (S), butadiene (B), isoprene (I) and their hydrogenated counterparts. Exemplary co-polymers are S—B—S, S-I-S, S-EB-S (hydrogenated derivatives of S—B—S), S—S/B—S(where SB denotes a random copolymer of styrene and butadiene), S-vB-S (where vB denotes a polybutadiene block with high vinyl content). In another embodiment, it is a block copolymer of styrene, isoprene and butadiene (S—B—I or S-I-B) including their hydrogenated counterparts.

For example, the polymeric grafting/branching agent is suitably selected from the group consisting of polybutadiene, polyisoprene, natural rubber, and block co-polymers, such as SBS (triblock, styrene-butadiene-styrene), SEBS (linear triblock copolymer based on styrene and ethylene/butylene) or SIS (styrene-isoprene-styrene). In a preferred embodiment, SBS or SEBS is used. In a another preferred embodiment, SIS is used. In a specific aspect, SEBS is both used as de-curing additive in step (ii) and as grafting/branching agent in step (iii) of a method as herein disclosed. Such process is advantageously carried out in an extruder, preferably at a temperature of at least about 270° C. See Example 7 and Scheme 2.

The amount of grafting/branching agent needed for reconstituting at least part of the fragments can vary and is readily determined by a person skilled in the art. In one embodiment, step (iii) is performed in the presence of about 0.1-20 wt % grafting/branching agent, preferably about 0.5-10 wt %, more preferably 1-7 wt %, based on the total dry weight of the rubber material.

The temperature at which the reconstitution is performed is not critical. Generally, step (iii) is performed at a temperature in the range of about room temperature to about 320° C., preferably in the range of about 100 to 300° C., more preferably 200-300° C.

It is an important practical advantage of a method of the present invention that steps (ii) and (iii) may suitably be performed as a one-pot-process, preferably in an extruder. Thus, step (iii) is conveniently carried out in an extruder, most preferably in one pot immediately after step (ii), at a range of temperatures, typically from room temperature up to 300° C. In case of a one pot process, this means that a first part of the extruder is used for network breakdown (high temperature and mechanical stress) while a second part of the extruder for the reconstitution, typically at a lower temperature.

For example, the destruction/fragmentation step is carried out in an extruder, preferably at about 300° C. in the absence of (de-curing) additives, followed by reconstitution in a batch mixer, in the presence of a grafting/branching agent, such as SEBS, at a temperature of at least 270° C. The residence time in the extruder can be in the range of up to 15, preferably up to 10 minutes. Good results were obtained with a residence time of about 4-5 minutes. Optionally, the extruded mixture is cooled and/or stored prior to being processed in the batch mixture. The batch residence time can vary but is often shorter than or equal to the extruder residence time. For example, it is in the range of up to 8 minutes, preferably up to 6 minutes. In a specific embodiment, the residence times for both the extrusion and the batch mixer is 4 minutes, preferably using about 5-10 wt % SEBS in the mixer step.

Figure 19:
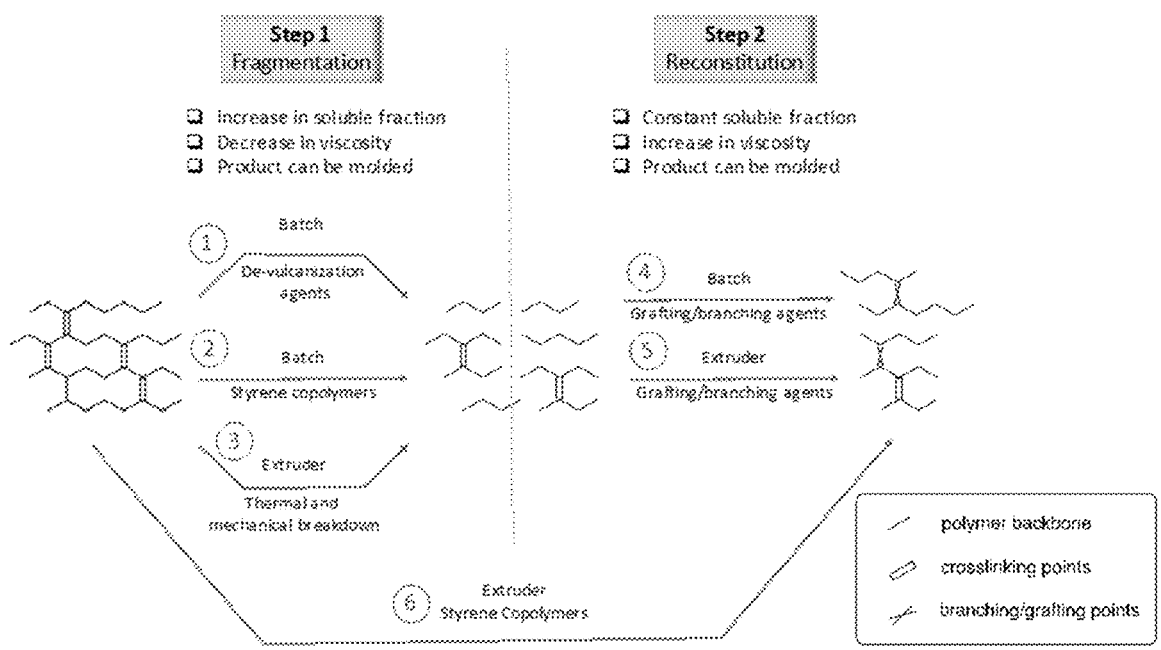

As will be appreciated by a person skilled in the art, a wide variety of variations can be made within the concept of a reclaiming method according to the invention. Scheme 2, which is shown in FIG. 19 provides a schematic overview of various embodiments of the invention.

In fragmentation step 1 (corresponding to step (ii) in a method as claimed), a rubber network is (unselectively) broken down into smaller fragments. This can be achieved in batch by using decuring/fragmentation additives such as "classical" de-vulcanization agents (1) or novel fragmentation additives like stirene copolymers (2). Alternatively, it is performed, preferably in an extruder, without any de-curing additives (3), thus relying on thermal and mechanical effects only. In all cases, the results, with respect to the initial network is a product that can be molded and is characterized by relatively high soluble fraction and low viscosity.

In reconstitution step 2 (corresponding to step (iii) in a method as claimed), the fragmented network is reconstituted with the aid of a grafting/branching agent, such as a low molecular weight compound and/or stirene copolymer(s). This can be achieved either in a batch (4) or an extruder (5). In any case, the product of this step can be molded and is characterized by a constant soluble fraction and an increased viscosity with respect to the broken network.

A combination of both steps in a one-pot process is also possible (3+5), for example by injecting the branching/grafting agent along the extruder after a first section of the extruder wherein the thermal and mechanical breakdown is achieved. In a specific embodiment, a one-pot process (6) can be performed in an extruder by feeding the rubber and "dual function additives", e.g. stirene copolymers, directly in the hopper. This stems from the chemical mechanism as stirene copolymers helps disrupting the network (through radical formation) and can also be grafted onto the rubber backbone.

The invention also provides a renewed rubber composition obtainable by a method according to the invention. In one embodiment, the rubber composition has a soluble fraction at least equal to 80%, preferably higher than 90%, of all the organic polymers present in the composition and having a crosslinking density for the insoluble fraction which is below 30%, preferably below 20%, more preferably below 10%, of the starting material.

With reference to Example 9 herein below, it is evident how a broad range of product properties is actually accessible with this technology depending on how the final product (before curing) is actually obtained, i.e. type of process as well as kind and amounts of additives. Notably, upon curing, renewed rubber compositions obtainable by a method according to the invention samples have a superior hardness and similar tensile strength as compared even to some raw GTR material [ref. 10].

Also provided is a rubber composition according to the invention in admixture with one or more components, such as with other rubber compounds as well as other materials such as bitumen and thermosets.

As will be appreciated by the skilled person, a method and/or rubber composition according to the invention finds its used in various applications, including the manufacture of tires, roofing material, flooring material and roadbuilding.

LEGEND TO THE FIGURES

FIG. 1: Influence of the addition of fragmentation/de-curing additives on the Mooney viscosity. *The mixture of chemicals is add as solid, instead of pre-liquefied.

Figure 2:
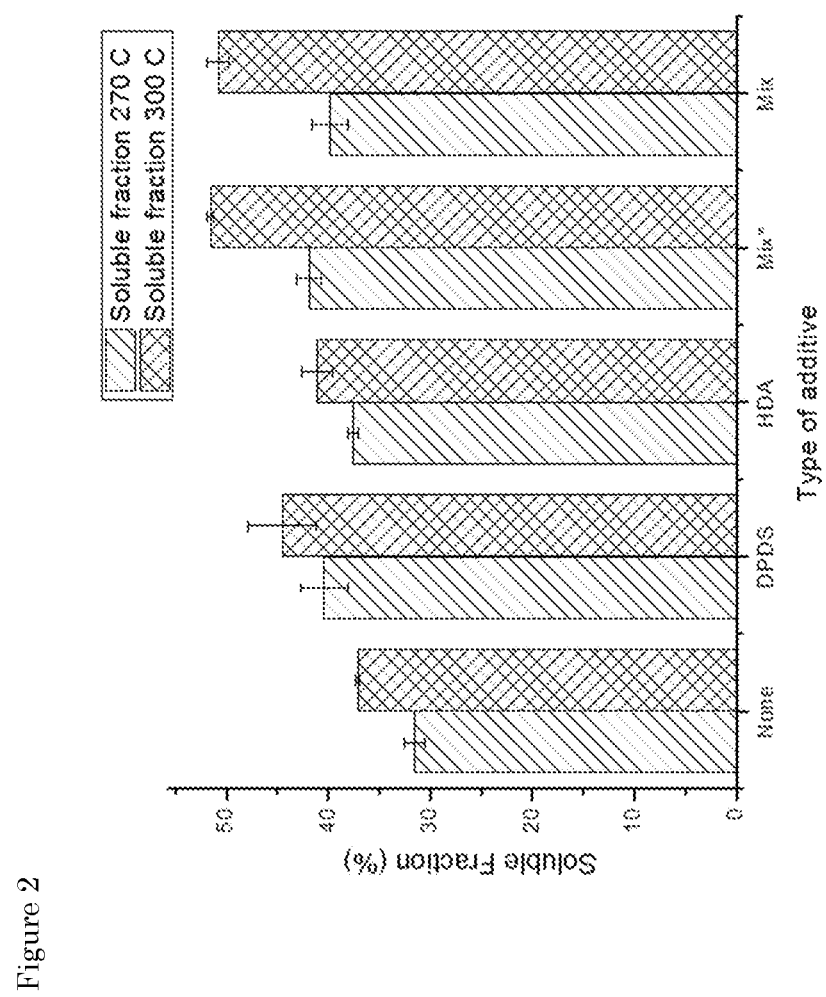

FIG. 2: Influence of the addition of fragmentation/de-curing additives on the soluble fraction. *The mixture of chemicals is add as solid, instead of pre-liquefied FIG. 3: Influence of the addition of fragmentation/de-curing additives on the crosslink density. *The mixture of chemicals is added as solid, instead of pre-liquefied FIG. 4: Influence of the addition of a branching/grafting agent (DVB; 2 or 5 wt %) on the Mooney viscosity. Ml means lowest Mooney value and Mh means highest Mooney value.

Figure 5:
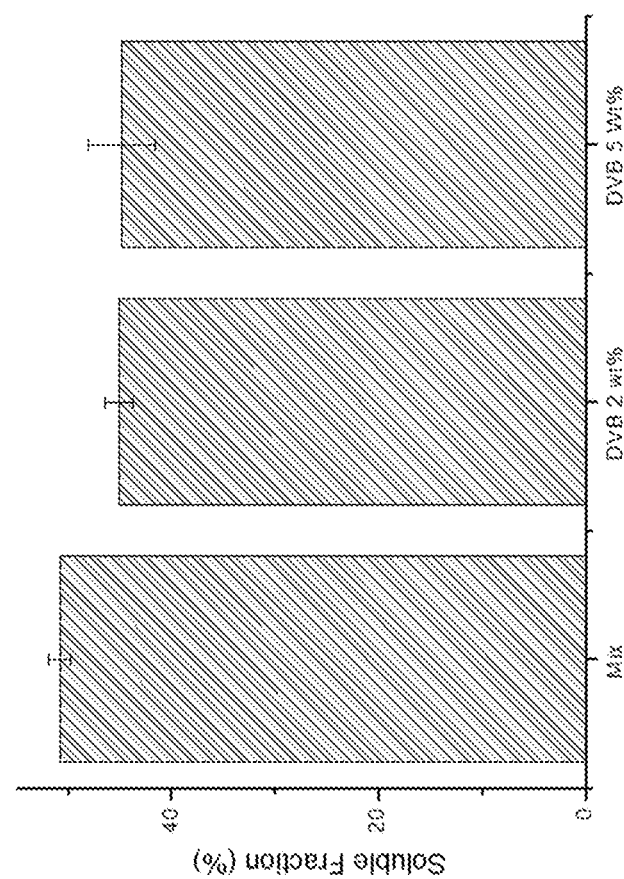

FIG. 5: Influence of the addition of a branching/grafting agent (DVB; 2 or 5 wt %) on the soluble fraction.

Figure 6:
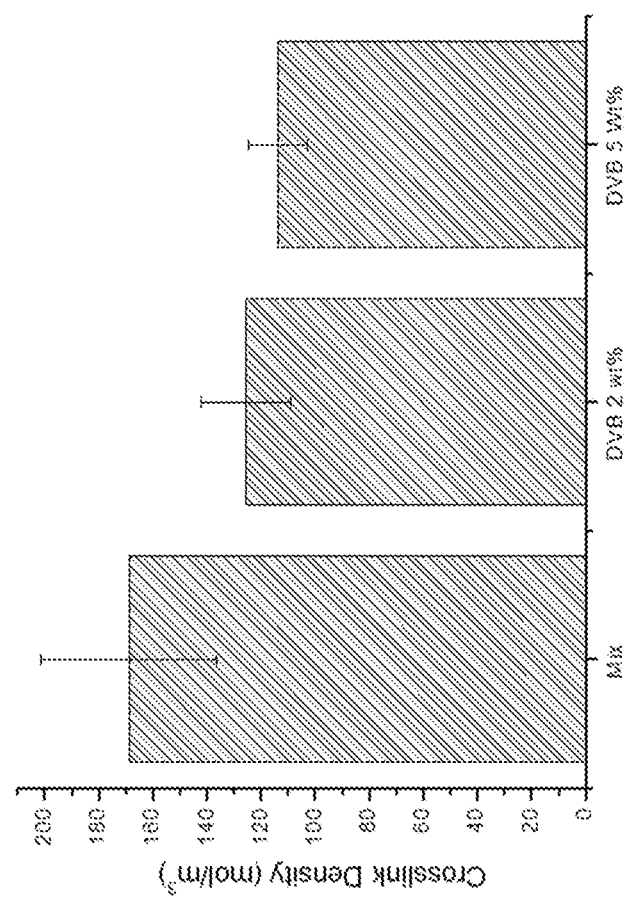

FIG. 6: Influence of the addition of a branching/grafting agent (DVB; 2 or 5 wt %) on the crosslink density.

Figure 7:
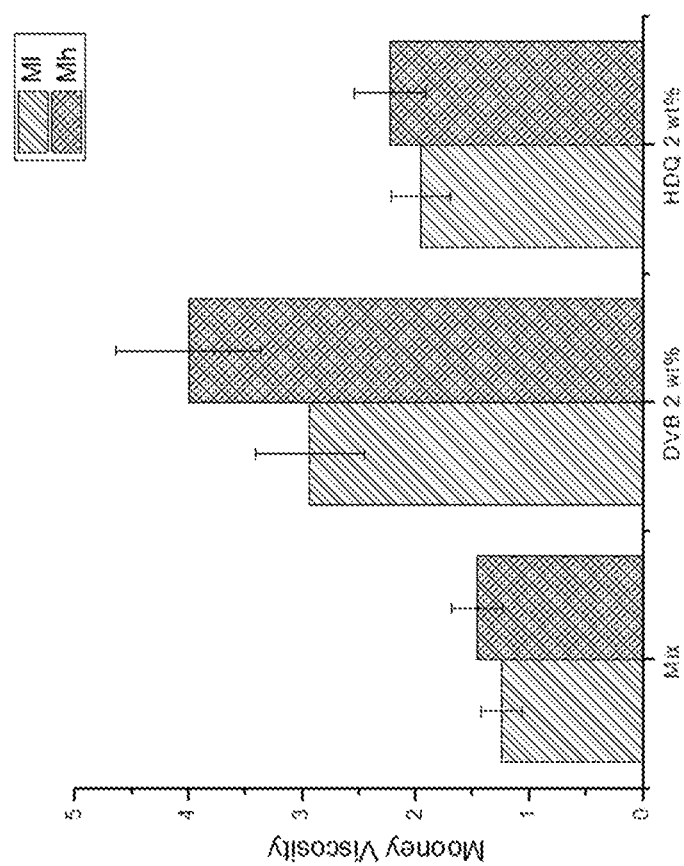

FIG. 7: Influence of different branching/grafting agents (DVB or hydroquinone (HDQ; 2 wt %) on the Mooney viscosity.

Figure 8:
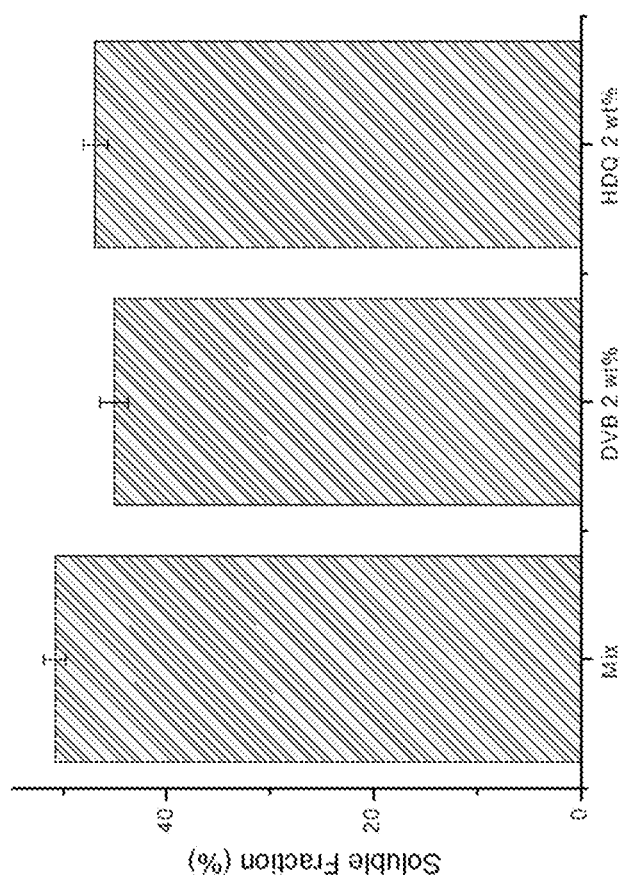

FIG. 8: Influence of different branching/grafting agents (DVB or hydroquinone (HDQ; 2 wt %) on the soluble fraction.

Figure 9:
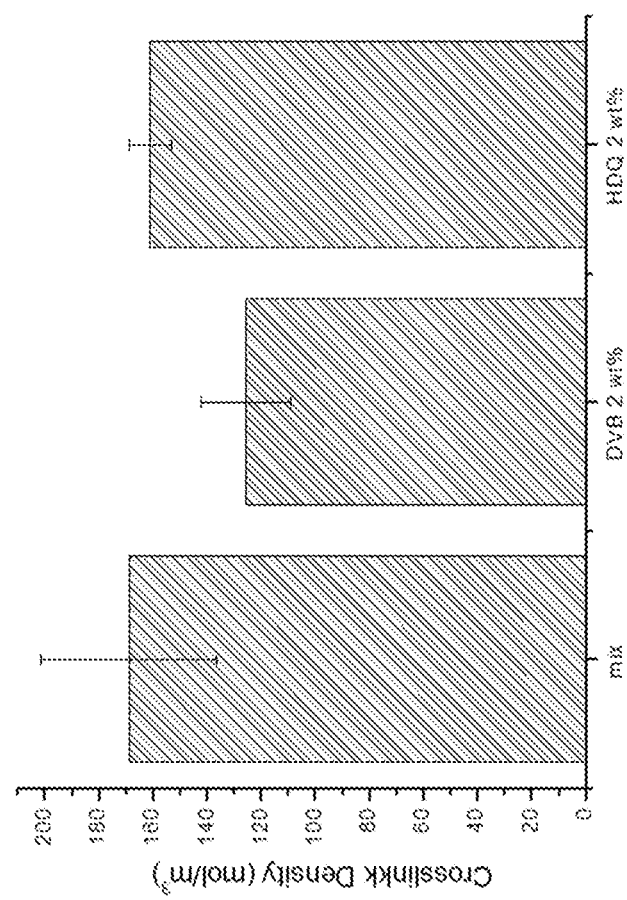

FIG. 9: Influence of different branching/grafting agents (DVB or hydroquinone (HDQ; 2 wt %) on the crosslink density.

Figure 10:
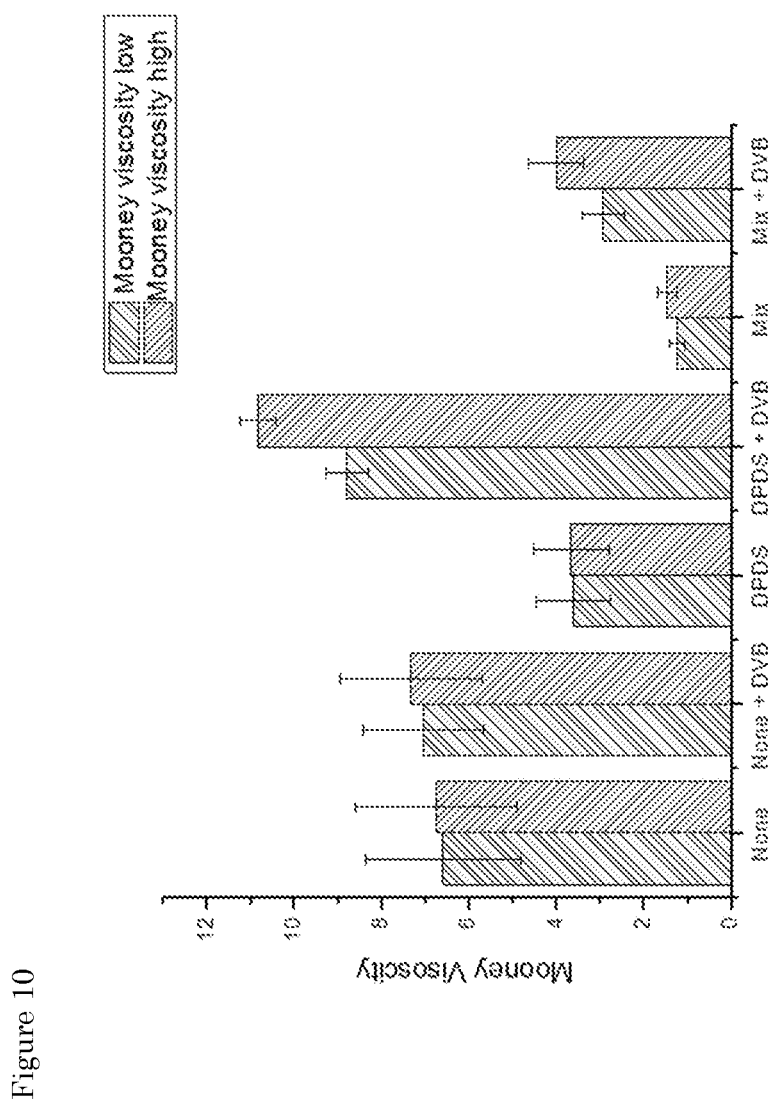

FIG. 10: Influence of fragmentation/de-curing additives in combination with branching/grafting agent (DVB; 2 wt %) on the Mooney viscosity.

Figure 11:
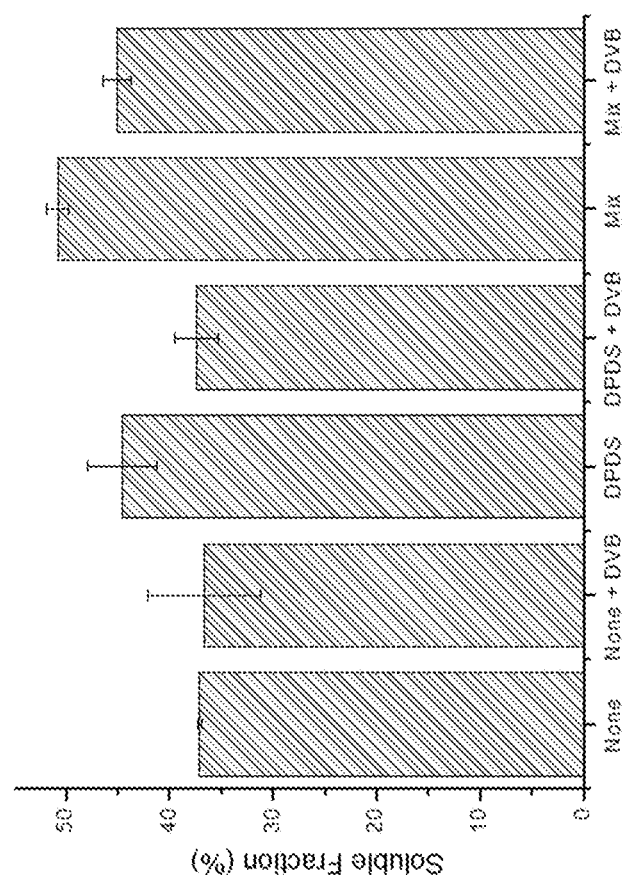

FIG. 11: Influence of fragmentation/de-curing additives in combination with branching/grafting agent (DVB; 2 wt %) on the soluble fraction.

Figure 12:
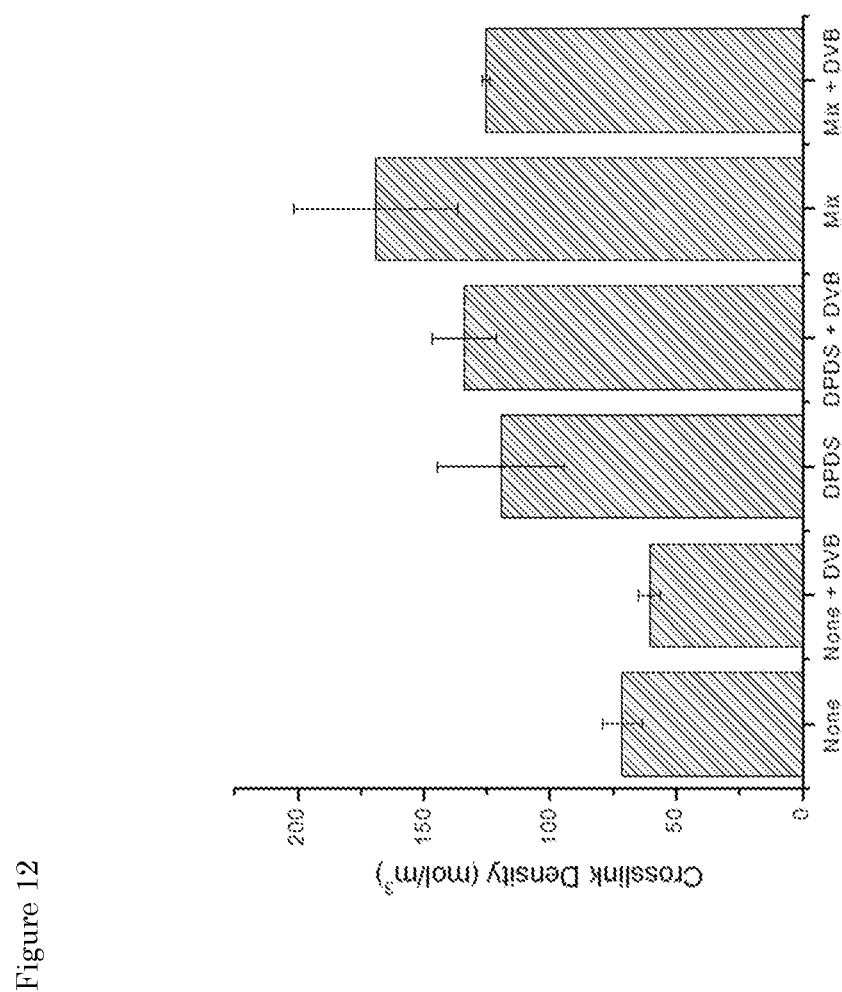

FIG. 12: Influence of fragmentation/de-curing additives in combination with branching/grafting agent (DVB; 2 wt %) on the crosslink density.

Figure 13:
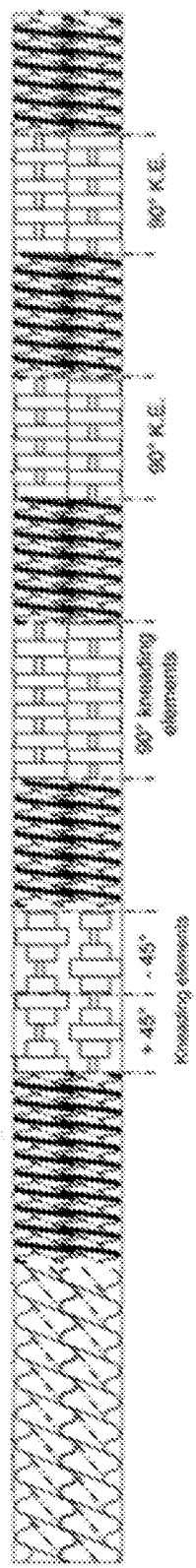

FIG. 13: Screw configuration employed for the continuous processes

Figure 14:
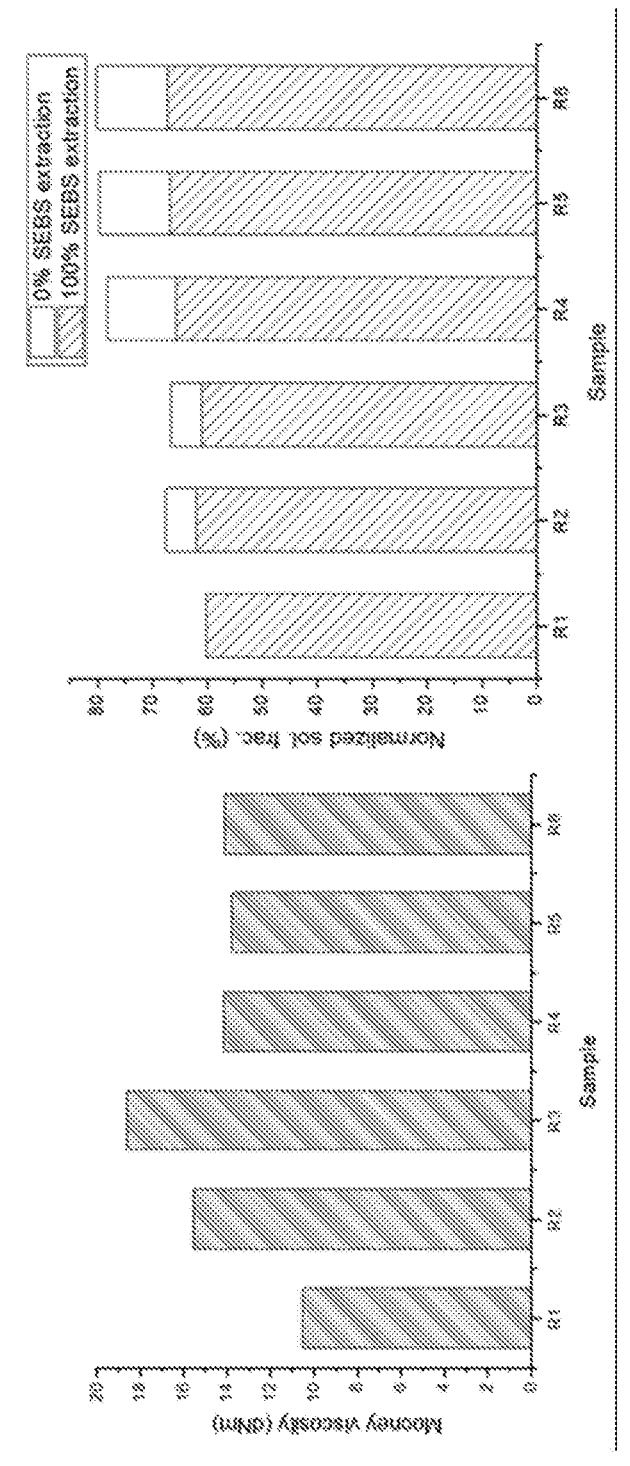

FIG. 14: Mooney viscosity values (left panel) and soluble fractions (right panel) for the samples specified in Table 4 and mixed with SEBS at 300° C.

Figure 15:
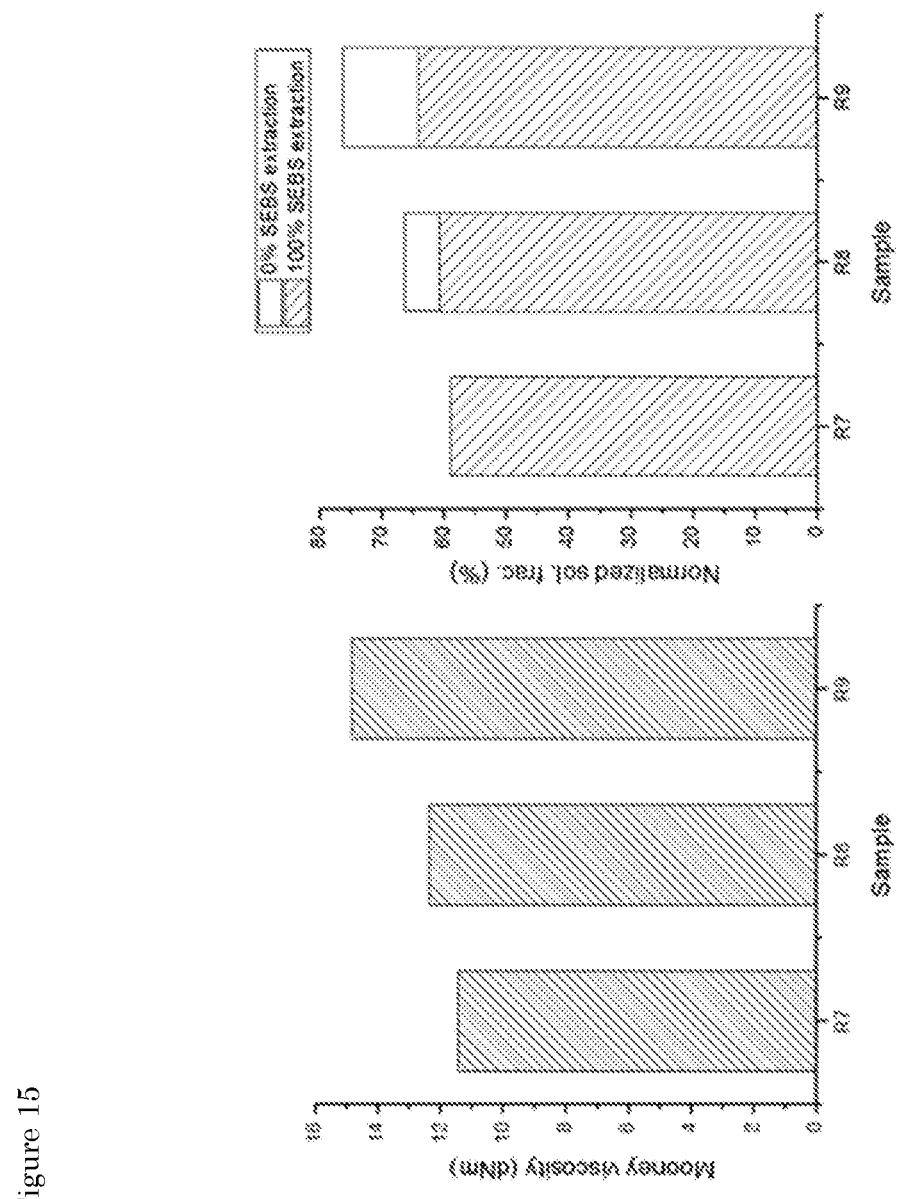

FIG. 15: Mooney viscosity values (left panel) and soluble fractions (right panel) for the samples specified in Table 4 and mixed with SEBS at 270° C.

Figure 16:
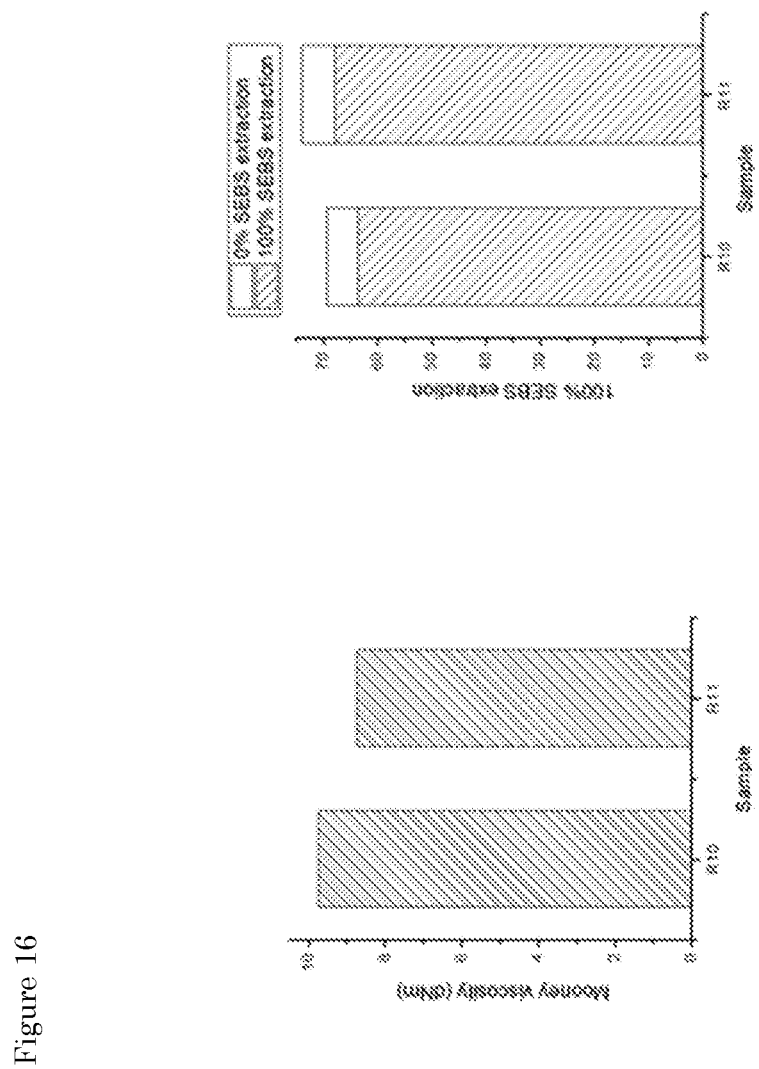

FIG. 16: Mooney viscosity (left panel) and soluble fraction (right panel) for GTR processed in one step (extruder) with 5 wt % SEBS.

Figure 17:
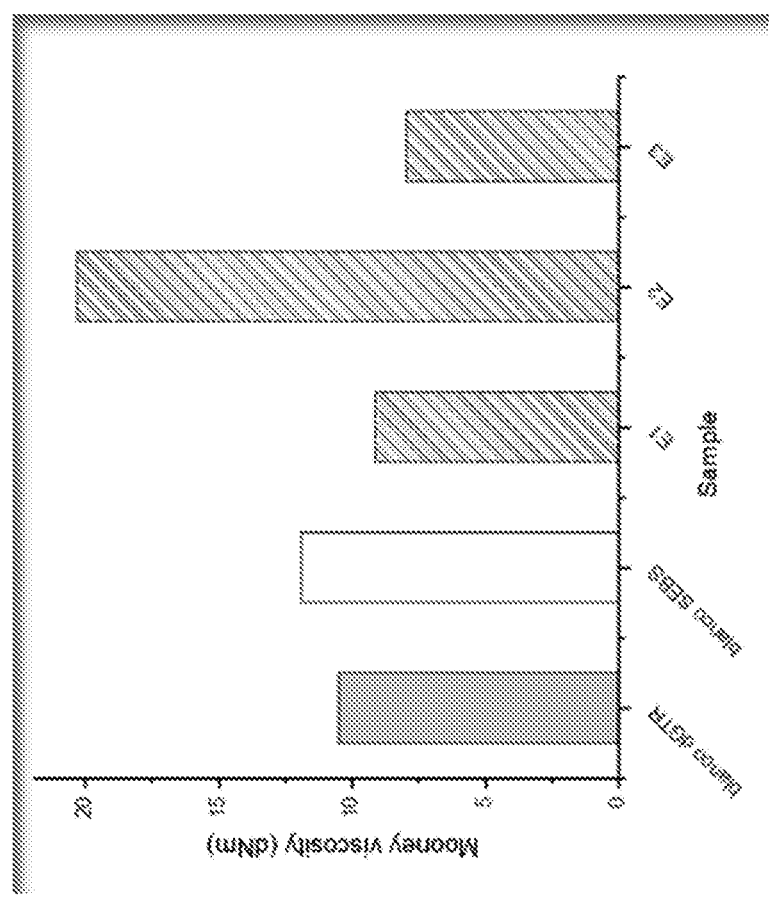

FIG. 17: Mooney viscosity values for samples prepared in extruder according to the conditions specified in Table 6.

Figure 18:
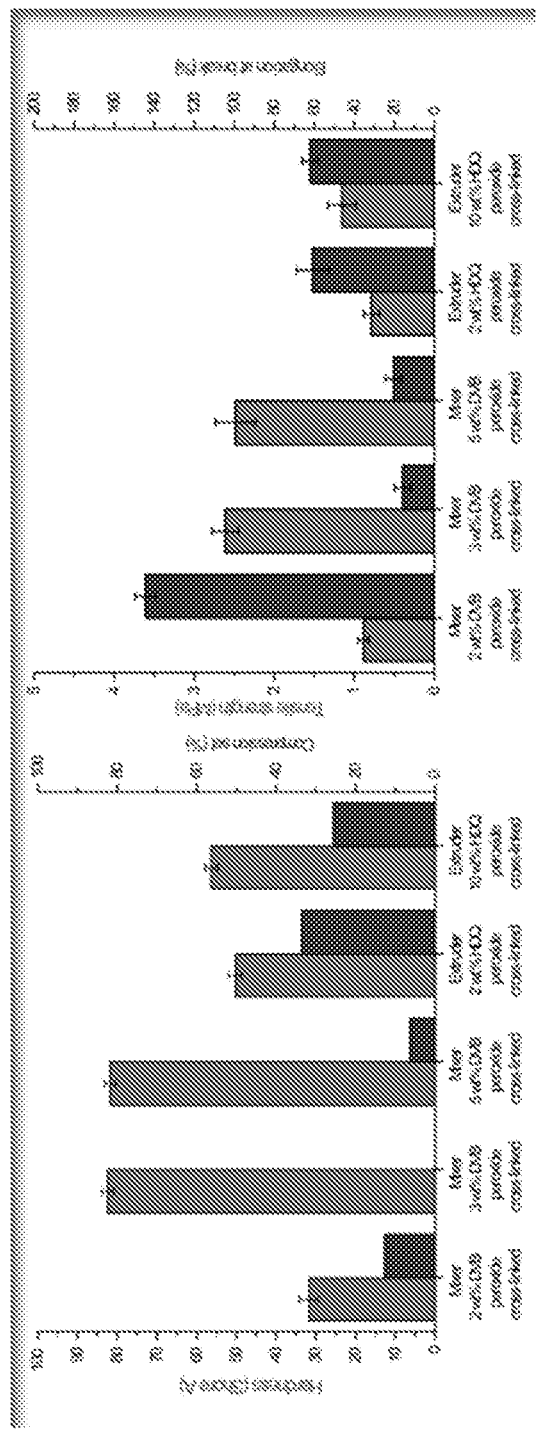

FIG. 18: Hardness and compressions set (left panel), tensile test and elongation at break (right panel) of cured samples.

FIG. 19: Shows Scheme 2, which provides a schematic overview of various embodiments of the invention.

EXPERIMENTAL SECTION

Materials and Methods

Materials

Divinylbenzene (DVB, 80%), polypropylene (PP, weight average molecular weight of approximately 250 kDa), di(tert-butylperoxyisopropyl)benzene (96%), and Hydroquinone (1,4-benzenediol) (HDQ) were purchased from Sigma Aldrich, and stored at 4° C. Diphenyl disulfide (DPDS, 99%) was purchased from Acros Organics and used as received. Acetone, tetrahydrofuran (THF), and toluene were purchased from Boom Chemicals. Hydrogenated stirene-butene/ethylene-stirene (SEBS) and stirene/isoprene/stirene (SIS) were kindly supplied by KRATON. All chemicals are used as received. The ground tire rubber (GTR) with a particle size between 0.2 and 0.6 mm was supplied by Genan, Germany.

Procedure of Preparing Samples

Two different equipment were used to prepare the samples.

For the batch processes, samples were prepared in a Brabender® batch mixer with a 350 cm$^3$ chamber and a fill factor of 0.5. The chamber was preheated at the desired temperature, and rinsed with nitrogen gas. The rotor speed, number and amounts of additives, processing temperature and residence time used in Examples 1-4 are specified Table 1. For the remaining Examples, they are indicated in every single example. After mixing, the sample was quenched in liquid nitrogen.

For the continuous processes a co-rotating twin screw extruder from APV Baker with a length of 1.25 m and a screw diameter of 5 cm was used (Sutanto et al. Chem. Eng. Sci., 61, 7077-7086 (2006) and J. Appl. Pol. Sci., 102, 5028-5038 (2006)) In particular, the screw configuration depicted in FIG. 13 was used. The exact experimental conditions, namely barrel temperature and screw speed rotation are specified in every single example. After the die, sample were directly immersed in a water bath to quench any possible further reaction.

Curing Experiments

Typically, 21 g of reclaimed sample from GTR treated according to the proposed process mixed with either DVB or HDQ was fed to an internal mixer (30 cm3, 70° C.) and was homogenised at 50 rpm for 2 min. Then, a spatula was used to slowly and evenly add 0.084 g peroxide (0.4 wt %) to the mixture. Mixing was continued for 2 min before the compound was removed from the mixer. This rubber compound was then cured by compression moulding at 160° C. and 100 bars for 35 min.

Determination of Soluble Fraction

Solubility of the polymer was used as measure for the determination of free polymer chains. During the boiling and extraction with different solvents, the free chains are extracted following the procedure in Table 2. The loss of weight from the sample is a measure for the amount of free polymer chains, and is calculated using Equation

TABLE 2

| EXTRACTION PROCESS IN FOSS SOXTEC ™ 2043 | | |
|---|---|---|
| Solvent | processing | Drying |
| Day 1 Acetone | 4 hour boiling + 4 hour extraction | Overnight at air |
| Day 2 THF | 6 hour boiling | Overnight at air |
| Day 3 Fresh THF | 8 hour boiling | Overnight at close system |

TABLE 2-continued

EXTRACTION PROCESS IN FOSS SOXTEC ™ 2043

| | Solvent | processing | Drying |
|---|---|---|---|
| Day 4 | THF | 8 hour boiling | Overnight at close system |
| Day 5 | THF | 4 hour boiling + 4 hour extraction | Over the weekend at air |

$$\text{Soluble fraction} = -1 * \frac{(W_E - W_I)}{W_I} * 100\% \quad (1)$$

$W_E$ Final weight [Kg]

$W_I$ Initial weight [Kg]

All values are normalized for the polymer fraction of GTR as determined by TGA. For samples containing mixtures with SIS or SEBS, the soluble fraction is calculated according to two methods:
1) assuming 100 wt % extraction of the triblock copolymer, in which case $W_1$ is assumed equal to the initial weight of all rubber component in GTR plus the amount of triblock copolymer added;
2) assuming 0 wt % extraction of the triblock copolymer, in which case $W_1$ is assumed equal only to the fraction of rubber components originally present in GTR as for all other experiments.

Determination of the Mooney Viscosity

Samples of approximately 10 grams were pre-moulded at 70° C. in a disc shape (diameter of 60 mm and height of 5 mm) and measured, in a Monsanto Rheometer ODR 2000 calibrated with a 133.85 dNm resistance, at 177° C. for 40 minutes. The readout is used as received.

Mechanical Properties

Mechanical properties were measured according to a published procedure (Polgar et al., European Polymer Journal 82 (2016) 208-219). Hardness was measured using a Bareiss Durometer, according to the ASTM D2240 standard. Square samples of 5×5 cm and thickness of 2.7±0.2 mm were prepared by compression moulding. Average values were obtained from 10 measurements. Compression set tests were performed according to the ASTM D931 standard, using a home-made device and cylindrical samples with a thickness (to) of 8.1±0.5 mm and a diameter of 13.0±0.1 mm, which were prepared by compression moulding. The samples were compressed to 75% ($t_n$) of their original thickness for 70 hrs at room temperature, then relaxed for 30 min in an oven at 50° C. ($t_i$). The compression set was then calculated using Equation 2.

$$C_B = \left(\frac{t_0 - t_i}{t_0 - t_n}\right) \cdot 100\% \quad \text{Equation (2)}$$

Tensile tests were performed on a Tinius Olsen H25KT with a clamp length of 15 mm, according to the ASTM D4-112 standard. Test samples of 45 mm long, 6.4±0.2 mm wide and 2.2±0.1 mm thick were prepared by compression moulding. The samples were cut in half using scissors allowing more measurements to be performed. For each measurement 6 samples were tested. Average values were taken.

Example 1: Reference Experiments

In order to gain insight into the influence of fragmentation temperature, as well as the role of fragmentation/de-curing agents, reference experiments were conducted. The first set of experiments was conducted in the absence of de-curing additives to investigate the influence of shear and thermal energy on the rubber. From S. Saiwari (Saiwari, 2013)] it is known that DPDS can be used to reclaim SBR, however, in this research GTR is used which consists of multiple types of rubber, including SBR. In the research of P. Susanto (P. susanto, 2006)] EPDM is reclaimed with HDA, which is used in this research as a second de-curing agent. Finally, a mixture of DPDS and HDA in a 1:1 weight ratio was used.

Figure 3:
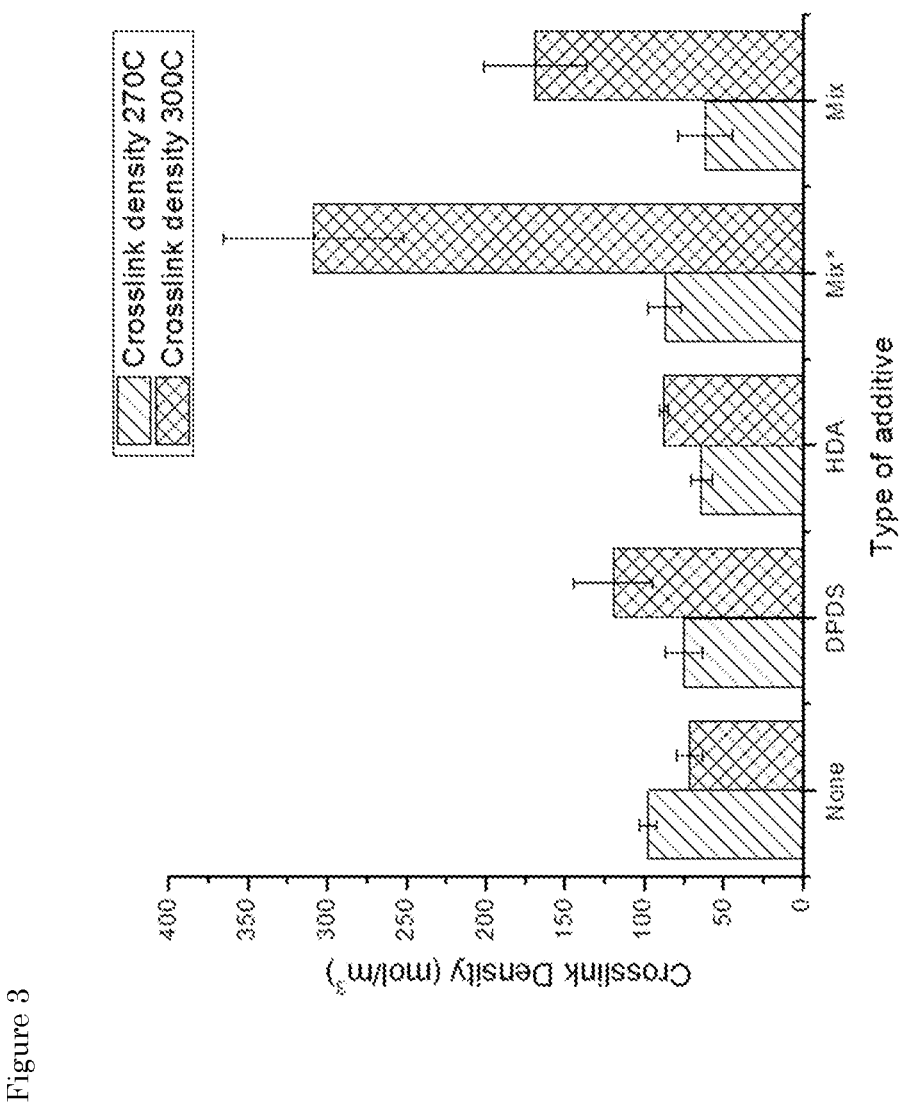

As shown in FIGS. 1-3, it can be concluded that, without additions, a simple increase in temperature results in a decrease in Mooney viscosity and, an increase in soluble fraction, while the crosslink density decreases. These results are expected, since an increase in thermal energy gives a higher chance of bond breakage.

Example 2: Effect of Adding a Branching/Grafting Agent

The following results are obtained with a mixing speed of 155 rpm, a mixing time of 4 minutes without branching/grafting agent (divinylbenzene; DVB), and 2 minutes with 2 or 5 wt. % DVB, at a pre heated Brabender of 300° C., with a 1:1:1 weight ratio mixture of fragmentation additives DPDS:HDA:TDAE.

Based on the results of Example 1, optimal process conditions for GTR were determined. Values found in the present work are a mixing time of 6 minutes, a mixing speed of 155 rpm, and a temperature of 300° C. Due to the mechanical shear and addition of DPDS, radicals are formed, and thus reactions are expected to happen via the initiation, propagation, termination process. In order to verify if a reaction has occurred, the Mooney viscosity of the product is be measured. Because of the complex nature of a mixture of rubbers and various parallel reactions, it is difficult to determine the topology of the formed chains. When the formed polymer is linear or entangled/branched, an increase in viscosity is proportional to an increase in molecular weight. However, a direct relation between viscosity and molecular weight does not exist. The results for this set of experiments are given in FIGS. 4-6 and compared to a benchmark experiment.

Figure 4:
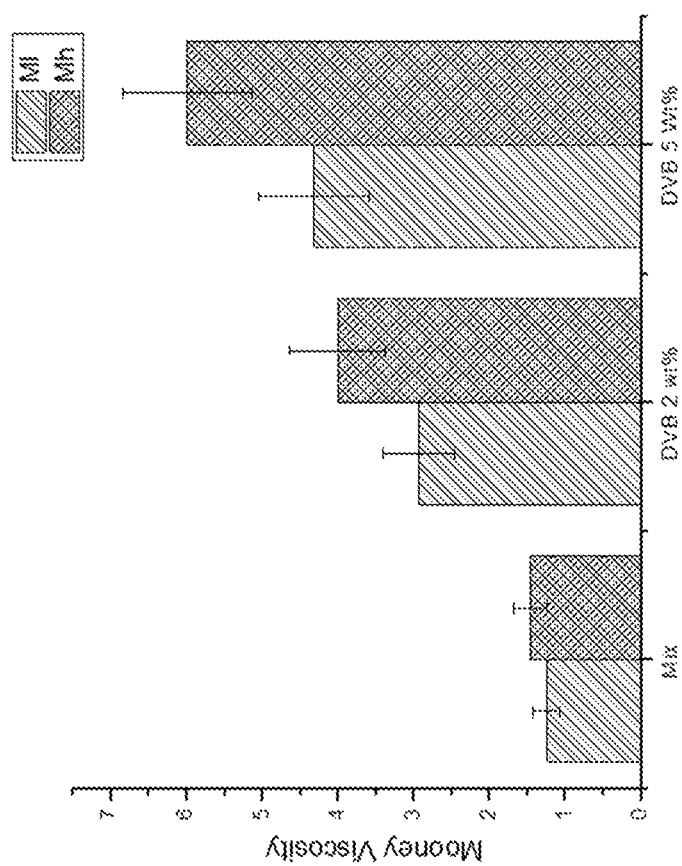

The increase in viscosity can be seen in FIG. 4; by the addition of 2 wt. % DVB to the GTR mixture, the Mooney viscosity increases from about 1.5 to 3, while by the addition of 5 wt. % DVB the Mooney viscosity increases to about 4, showing that there is an increase in molecular weight, and thus that chains are extended or polymer crosslinks are made. In FIG. 5, it can be seen that by the addition of DVB, the soluble fraction is slightly decreased. This is an expected result, since free rubber compounds are absorbed onto carbon black, forming bound rubber. The latter is backed by FIG. 6, since by the addition of DVB the crosslink density slightly drops, meaning that there is more rubbery compound per crosslink left in the sample, e.g. longer chains have absorbed onto carbon black as bound rubber.

Coupling the latter results back to the aim of this invention: to cleave the entire rubber including sulphur crosslinks and re-assembling the backbone with a poly-functional monomer there can be seen that from the initial degraded state (Mix) to the addition of DVB in 2 and 5 wt. % the Mooney viscosity increases, which means branched chains are expected to be present in the rubbery mixture. In case lone chains are crosslinked, they are insoluble. However, linear rubber chains are. In FIG. 5 it can be seen that the soluble fraction is approximately the same for the addition of DVB at an increased viscosity, indicating that the longer formed rubbery chains can freely move in the mixture and are therefore not crosslinked.

Example 3: Comparison of Divinylbenzene to Hydroquinone

This example demonstrates that hydroquinone is suitably used as alternative branching/grafting agent.

The following results are obtained by using a mixing speed of 155 rpm, a mixing time of 4 minutes without 2 wt. % divinylbenzene (DVB) or 2 wt. % Hydroquinone (HDQ) and 2 minutes with either DVB or HDQ, at a pre heated Brabender of 300° C., with a 1:1:1 weight ratio mixture of DPDS:HDA:TDAE. The results of the previous experiments are showing proof of concept. In this set of experiments, the concept is further tested by using another bifunctional monomer: a diol, instead of a divinyl. The results are given in FIGS. 7-9 and are compared to the results of DVB and reference experiment. By using HDQ instead of DVB, the viscosity increases although somewhat less pronounced compared to with DVB. The latter again shows that the soluble fraction remains constant, while the crosslink density is found to increase slightly.

Example 4: Influence of Fragmentation/De-Curing Additives in Combination with Branching/Grafting Agent The following results were obtained by using a mixing speed of 155 rpm, a mixing time of 4 minutes without DVB and 2 minutes with 2 wt. % DVB, at a pre heated Brabender of 300° C., while varying the used fragmentation/de-curing additives. First, only the processing oil TDAE was used; second a 1:1 weight ratio mixture TDAE:DPDS, and third a 1:1:1 weight ratio mixture TDAE:DPDS:HDA was used.

As side step from the main route, of using a mixture of the fragmentation/de-curing agents DPDS and HDA, is leaving out HDA or both HDA and DPDS but adding a branching/grafting agent (DVB) to the mixture. Since de-curing additives are often at a high material cost, and a possible environmental issue, limiting their use is highly desirable. In Scheme 3A below, the pathway for a reaction without DPDS and HDA is given, while in Scheme 3B, the pathway for a reaction with DPDS is given.

Scheme 3A: De-curing/fragmentation by heat and shear only, followed by reaction with DVB.

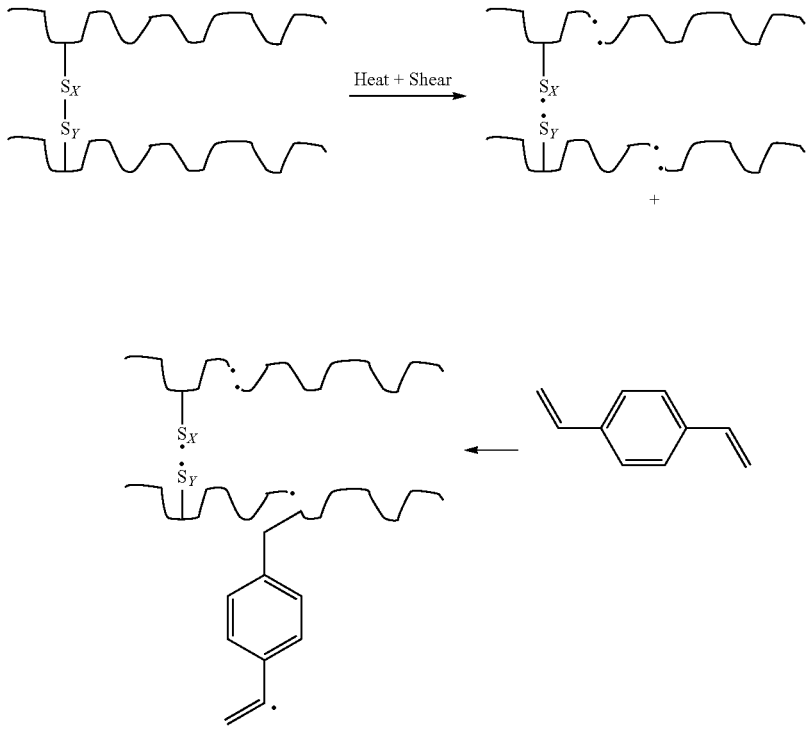

Scheme 3B: De-curing/fragmentation using DPDS, heat and shear, followed by a reaction with DVB.

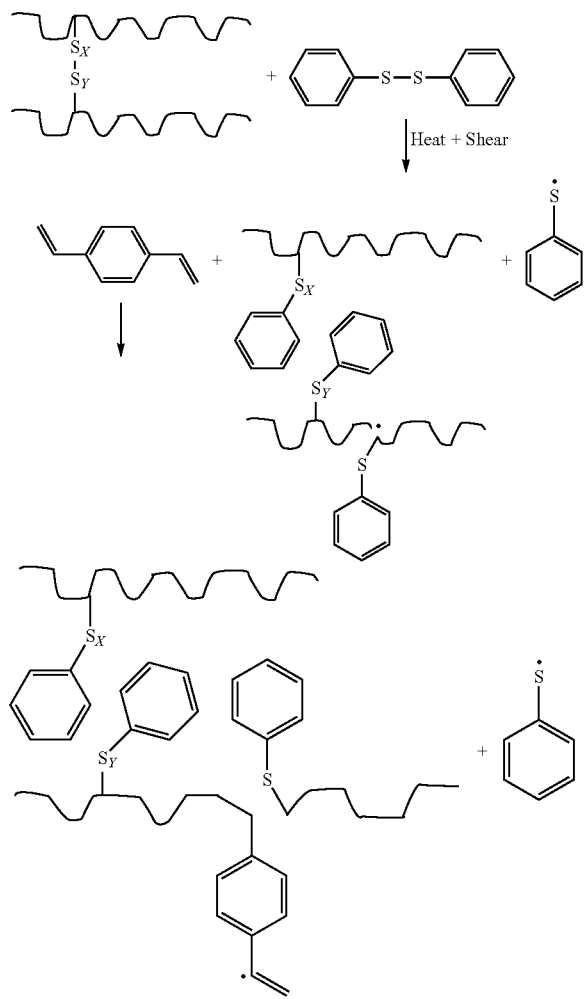

The results of this experiment are displayed in FIGS. 10-12 and compared to each initial state, as well as to the results wherein a mixture of DPDS and HDA is used.

The results for all additives are showing the expected viscosity behavior for addition of DVB, namely increased viscosity by addition of DVB. Comparing the soluble fractions only equality can be seen when no reclamation chemicals are used. When using DPDS, or a mixture of DPDS and HDA, the non-treated samples show a higher soluble fraction than when treated with DVB. For DPDS, the crosslink density increases, as expected, since the soluble fraction follows the opposite behavior of crosslink density in most cases. The latter does not hold when DVB is used by the mixture of DPDS and HDA. There, an increase in viscosity is noticed, while the soluble fraction decreases slightly and crosslink density decreases.

Reasons for the observed differences are that extra radicals are introduced by the addition of DPDS. These radicals can react with the rubber chains, leading to scission, or initiate DVB. In FIG. 10 it can be seen that when DPDS is used and DVB is introduced, the Mooney viscosity increases 2.4 times, showing that branched rubbery chains are formed. However, a part of those branched chains is less soluble, probably due to the formation of bound rubber. This is also shown by the slight increase in crosslink density in FIG. 12.

Example 5: Rubber Reclaiming Method as a Batch or Continuous Process

In order to achieve network disruption, experiments were carried out in either a batch or a continuous process (extruder), the latter with an approximate residence time calculated of about 4 minutes. An overview of the prepared sample including experimental conditions is listed in Table 3.

TABLE 3

Overview of parameters used in batch and continuous experiments

| Sample Code | Temperature (° C.) | Additives | Process | Moldable Yes (Y)/No (N) |
|---|---|---|---|---|
| A1 | 200 | None | Batch | N |
| A2 | 250 | None | Batch | N |
| A3 | 270 | None | Batch | N |
| A4 | 300 | None | Batch | N |
| A5 | 300 | 5 wt % SEBS | Batch | Y |
| A6 | 300 | 5 wt % PP | Batch | Y |
| A7 | 220 | None | Continuous | N |
| A8 | 250 | None | Continuous | N |
| A9 | 270 | None | Continuous | N |
| A10 | 300 | None | Continuous | Y |

By processing GTR in an extruder at a screw speed of 100 rpm without any de-curing additives (samples A7-A10), only heating above 270° C. results in a material that can be molded in a disc according to the procedure described in Materials and Methods. This means that the combination of the specific mechanical stress generated by the screws and a minimum temperature of 270° C. result in the desired level of network disruption, which in turn allow molding into a disc.

In the batch mixer, up to temperatures of 300° C. (samples A1-A4 in Table 3) no uniform material is generated, which in turn cannot be molded into a disc under the specified conditions. Thus, as above, the combination of the mechanical stress generated in the mixer and temperature does not yield a uniform material that can be molded into a disc, i.e. the extent of network disruption is insufficient. However, when co-feeding in the batch mixer 5 wt % of PP or SEBS (A5 and A6 in table 3) as de-curing additive, the resulting material is uniform and can be easily molded into a disc under the specified conditions.

Example 6: Fragmentation and Reconstitution Steps as Separate Processes

In this series of experiments, the first step (fragmentation comprising destruction of cross-links and backbone) was carried out in an extruder, whereas the second step (reconstitution) in a batch mixer. See Materials and Methods section for equipment details. GTR was processed in extruder at 300° C. (barrel temperature) without any additive (100 rpm screw speed and mass flow rate $Q_M$ of 10 kg/hr), was cooled in water and stored at 4° C. before being processed in a batch mixer at different temperatures with different SEBS intakes and residence times (i). An overview of the samples that were prepared is given in the table 4. eGTR denotes GTR processed in extruder, T the temperature during the second step in the batch mixer and τ is the total residence time, with the first number denoting the one in extruder and the second one in the batch mixer

TABLE 4

Sample overview prepared in extruder (network disruption) and processed (reconstituted) in a batch mixer with addition of SEBS at 59 rpm.

| Sample code | eGTR/SEBS (wt/wt) | τ (min + min) | T (° C.) |
|---|---|---|---|
| R1 | 100/0 | 4 + 2 | 300 |
| R2 | 95/5 | 4 + 2 | 300 |
| R3 | 95/5 | 4 + 4 | 300 |
| R4 | 90/10 | 4 + 2 | 300 |
| R5 | 90/10 | 4 + 4 | 300 |
| R6 | 90/10 | 4 + 5 | 300 |
| R7 | 100/0 | 4 + 2 | 270 |
| R8 | 95/5 | 4 + 2 | 270 |
| R9 | 90/10 | 4 + 2 | 270 |

All samples were characterized in on the basis of their soluble fraction and Mooney viscosity values as described herein above. In this case, it is not possible to predict whether SEBS will be extracted in the THF fraction or will be bound to the insoluble residue. Therefore, the soluble fraction is presented by the two extremes (no SEBS soluble in THF vs. all SEBS soluble in THF). The results obtained (FIG. 14) show that at comparable soluble fraction values, the Mooney viscosity is in any case higher than the one for the reference experiment (R1) without SEBS.

The data indicate that, for almost constant soluble fraction values, different viscosity values can be easily obtained by either changing the amount of SEBS in the feed or the residence time during the second step. When aiming at high viscosity values, an optimum seems to exist at 5 wt % SEBS and a mixing time of 4 minutes.

The same conclusion can be drawn from the results obtained with samples R7, R8 and R9 that were processed at 270° C. in the second step (FIG. 15).

The following can be concluded:
1) Viscosity values are higher than the reference sample (R7) without SEBS;
2) At comparable soluble fraction, different viscosities can be obtained by changing the amount of SEBS in the feed;
3) When aiming at high viscosity, an optimum seems to exist at 10 wt % SEBS.

At both temperatures, the data above clearly illustrate the role of a "branching/grafting agent" in modulating the viscosity of the final product, while maintaining a relatively high and constant soluble fraction. The skilled person will understand that a branching/grafting agent for use in the present invention are not de-vulcanizing agents because they are not used during the network disruption step and they do not result in lower viscosity values. They are neither cross-linking agents since the soluble fraction remains constant even if viscosity increases with respect to the reference. Rather, in view of the possible mechanism (radical degradation reactions of SEBS at high temperature) it is conceivable that SEBS acts as grafting/branching agent during processing. Indeed, this would mean an almost constant soluble fraction coupled with an increase in viscosity to the branching/grafting.

Example 7: Fragmentation and Reconstitution Steps in One-Pot Process

The active role of SEBS as grafting/branching agent during the second step of the process (see Example 6) as well as fragmentation additive in promoting the network disruption (Example 5) indicate the possibility to carry out a method of the invention in one single procedure as a one-pot-process.

This example demonstrates that this indeed possible by extruding a mixture of GTR and SEBS (5 wt %) in an extruder at different temperature with screw speed of 100 rpm and $Q_M$=10 kg/hr. An overview of the samples thus prepared is shown in can be found in Table 5.

TABLE 5

Overview of samples prepared in a single step by co-feeding SEBS with GTR in an extruder.

| Code | $Q_M$ (kg/hr) | τ (min) | GTR/SEBS (wt/wt) | T (° C.) | Screw speed (rpm) |
|---|---|---|---|---|---|
| R10 | 10 | 4 | 95/5 | 270 | 100 |
| R11 | 10 | 4 | 95/5 | 300 | 100 |

The results obtained (FIG. 16) show that at almost constant soluble fraction the Mooney viscosity can be influenced, by the processing temperature.

Notably, in analogy to what was observed for the batch mixer (Example 4), also for the extruder at a relatively low temperature (270° C.), the mere addition of SEBS delivers a uniform product that is readily moldable into a disc.

Example 8: Variations in Extruder Parameters

In view of the possibility to carry out the method steps in a one pot procedure by using SEBS as "dual function" additive, experiments were performed to optimize typical extruder parameters, in particular the screw speed as related to throughput along the extruder. An overview of the samples prepared can be found in Table 6.

TABLE 6

Overview of samples prepared in extruder at different flow rate and screw speed at a constant temperature (300° C.) and SEBS intake (5 wt %).

| Sample Code | $Q_M$ (kg/hr) | Screw speed (rpm) |
|---|---|---|
| E1 | 7.2 | 50 |
| E2 | 10 | 100 |
| E3 | 12.5 | 75 |

In this particular case, the inventors were looking at maximum in viscosity values for the corresponding products, since that would indicate an optimum for the SEBS-induced reactions. GTR and SEBS extruded under the same experimental conditions were taken as references materials. The results (FIG. 17) show that an optimum exists for 100 rpm screw speed and a flow rate of 10 kg/hr. It is of note that different conditions can actually result in a product with comparable viscosity with respect to the reference materials.

Example 9: Rubber Compositions of the Invention

The final product of a rubber reclaiming process of the present invention is a reclaimed rubber having a relatively high soluble fraction and a variable viscosity. In order to determine if it is possible to cure this product "as such", it was processed in a batch mixer with 0.4 wt % di(tert-butylperoxyisopropyl)benzene (BIPB), a radical initiator able to crosslink the polymeric chains.

Processed GTR samples prepared according to the experimental conditions reported in Table 7 were used.

TABLE 7

Overview of conditions for curing experiments

| Sample | Experimental conditions step 1 | Experimental conditions step 2 |
|---|---|---|
| Batch 2 wt % DVB | Batch, 5 wt % DPDS, | Batch, 2 wt % DVB |
| Batch 3 wt % DVB | Batch, 5 wt % DPDS | Batch, 3 wt % DVB |
| Batch 5 wt % DVB | Batch, 5 wt % DPDS | Batch, 3 wt % DVB |
| Extruder 2 wt % HDQ | Extruder, no additives | Batch, 2 wt % HDQ |
| Extruder 10 wt % HDQ | Extruder, no additives | Batch, 10 wt % HDQ |

All "batch" processes were carried out in an internal mixer for 6 minutes (step 2 starting after 4 minutes of step 1) of 50 rpm rotor speed and a temperature of 300° C. All "extruder" samples were prepared by carrying out the first step in an extruder (at 300° C., $Q_M$=10 kg/hr and screw speed of 100 rpm) followed by the second step in an internal mixer (mixing time of 2 minutes at 300° C. and rotor speed of 50 rpm. After curing (see Materials and Methods for details) several different product properties were measured (FIG. 18).

REFERENCES

[1] i. Columbia engineered rubber, "Rubber Materials & Elastomer compound information," Eagle registrations inc., 2013. [Online]. Available: http://www.columbiaerd.com/materials.html#sbr. [Accessed 20 Nov. 2015].

[2] T. r. economist, "SR production," 2008. [Online]. Available: http://www.therubbereconomist.com/The_Rubber_Economist/SR_production.html. [Accessed 20 Nov. 2015].

[3] Statista.com, "Global consumption of natural and synthetic rubber from 1990 to 2015 (in 1,000 metric tons)," 2015. [Online]. Available: http://www.statista.com/statistics/275399/world-consumption-of-natural-and-synthetic-caoutchouc/. [Accessed 20 Nov. 2015].

[4] WOODRUB, Utilisation of recovered wood and rubber for alternative composite products, LIFE09 ENV/ES/000454.

[5] A. Keuringseisen, "APK keuringseisen voor wielen," 2015. [Online]. Available: http://www.apkkeuringseisen.nl/apk-keuring/apk-keuringseisen-voor-wielen/. [Accessed 24 Nov. 2015].

[6] Brown, Proceedings of the Recycling of Rubber Meeting, London, UK: Institute of Materials, 2008, December.

[7] U. projects, "Applications for recycled rubber," Elegant Themes, 2015. [Online]. Available: http://www.universe-projects.com/technologies/tire-recycling/applications-for-recycled-rubber/. [Accessed 24 Nov. 2015].

[8] C. Blow, Rubber Technology and Manufacture, Butterworth, London, 1982.

[9] I. CalRecovery, "Evaluation of Waste tire "Devulcanization Technologies"," 2004.

[10] Zhang X, Lu C and Liang M. 'Properties of natural rubber vulcanizates contain-ing mechanochemically devulcanized ground tire rubber'. In: *Journal of Polymer Research* 16 (2009), pp. 411-419].

TABLE 1

| Experiment label | Temperature | Mixing speed (rpm) | Mixing time (min.) | TDAE (wt %) | DPDS (wt. %) | HDA (wt. %) | DVB (wt. %) | HDQ (wt. %) |
|---|---|---|---|---|---|---|---|---|
| none | 270 | 50 | 6 | 5 | | | | |
| none | 300 | 50 | 6 | 5 | | | | |
| DPDS | 270 | 50 | 6 | 5 | 5 | | | |
| DPDS | 300 | 50 | 6 | 5 | 5 | | | |
| HDA | 270 | 50 | 6 | 5 | | 5 | | |
| HDA | 300 | 50 | 6 | 5 | | 5 | | |
| Mix* | 270 | 50 | 6 | 5 | 5 | 5 | | |
| Mix* | 300 | 50 | 6 | 5 | 5 | 5 | | |
| Mix | 270 | 50 | 5 | 5 | 5 | 5 | | |
| Mix | 300 | 50 | 6 | 5 | 5 | 5 | | |
| 6 | 300 | 80 | 6 | 5 | 5 | 5 | | |
| 6 | 300 | 155 | 6 | 5 | 5 | 5 | | |
| 6 | 300 | 230 | 6 | 5 | 5 | 5 | | |
| 18 | 300 | 80 | 18 | 5 | 5 | 5 | | |
| 18 | 300 | 155 | 18 | 5 | 5 | 5 | | |
| 18 | 300 | 230 | 18 | 5 | 5 | 5 | | |
| 30 | 300 | 80 | 30 | 5 | 5 | 5 | | |
| DVB 2 wt % | 300 | 155 | 4 + 2 | 5 | 5 | 5 | 2 | |
| DVB 5 wt % | 300 | 155 | 4 + 2 | 5 | 5 | 5 | 5 | |
| HDQ 2 wt % | 300 | 155 | 4 + 2 | 5 | 5 | 5 | | 2 |
| 6 + 2 DVB 5 wt % | 300 | 155 | 6 + 2 | 5 | 5 | 5 | 5 | |
| 4 + 2 HDQ 5 wt % | 300 | 155 | 4 + 2 | 5 | 5 | 5 | | 5 |
| 6 + 2 HDQ 5 wt % | 300 | 155 | 6 + 2 | 5 | 5 | 5 | | 5 |
| None + DVB | 300 | 155 | 4 + 2 | 5 | | | 2 | |
| DPDS + DVB | 300 | 155 | 4 + 2 | 5 | 5 | | 2 | |

The invention claimed is:

1. A method for reclaiming rubber, comprising the steps of (i) providing a starting material comprising a vulcanized rubber polymer;

(ii) subjecting the starting material to mechanical stress and at a temperature of at least 200° C. either in the absence of a fragmentation additive, or in the presence of a fragmentation additive capable of generating radicals at the temperature used, to achieve at least a partial destruction of the cross-links and the backbone structure of the rubber polymer into fragments; and (iii) partially reconstituting the fragments obtained in step (ii) in the presence of a branching/grafting agent to obtain a renewed rubber composition.

2. Method according to claim 1, wherein said starting material comprises a mixture of two or more distinct rubbers.

3. Method according to claim 1, wherein said starting material comprises ground tire rubber (GTR) from car tires and/or truck tires.

4. Method according to claim 1, wherein step (ii) is performed in the presence of a fragmentation additive capable of generating radicals at the temperature used.

5. Method according to claim 4, wherein the fragmentation additive is a polymer which undergoes thermal degradation above 200° C.

6. Method according to claim 5, wherein said polymer is a linear triblock copolymer based on styrene and ethylene/butylene (SEBS).

7. Method according to claim 1, wherein step (ii) is performed in the absence of a fragmentation additive.

8. Method according to claim 1, wherein step (ii) is performed at a temperature of at least 220° C.

9. Method according to claim 1, wherein step (ii) is performed under mixing using in high-shear mixing equipment.

10. Method according to claim 1, wherein said branching/grafting agent comprises a plurality of unsaturated moieties capable of reacting with free radicals.

11. Method according to claim 10, wherein said branching/grafting agent comprises the general structure F'—R—F", wherein each of F' and F" is an unsaturated moiety capable of reacting with free radicals.

12. Method according to claim 10, wherein said branching/grafting agent is a bifunctional agent comprising C=C bonds.

13. Method according to claim 12, wherein said bifunctional branching/grafting agent is selected from the group consisting of substituted or unsubstituted hydroquinone, substituted or unsubstituted divinylbenzene, and substituted or unsubstituted bismaleimide, which bifunctional branching/grafting agent is used under non-crosslinking conditions.

14. Method according to claim 10, wherein said branching/grafting agent is a polymeric agent comprising multiple F moieties attached to a polymeric backbone, F being an unsaturated moiety capable of reacting with free radicals, preferably independently selected from —C=C— and C=O.

15. Method according to claim 13, wherein said polymeric branching/grafting agent is a co-polymer of the type A-B-A, wherein each of A and B is independently selected from the group of homo- and or co-polymers of styrene (S), butadiene (B), isoprene (I) and their hydrogenated counterparts.

16. Method according to claim 1, wherein step (iii) is performed in the presence of about 0.1-20 wt % branching/grafting agent.

17. Method according to claim 1, wherein steps (ii) and (iii) are performed as a one-pot-process.

18. Method according to claim 17, wherein SEBS is used.

19. Method according to claim 1, wherein step (ii) is performed in an extruder and step (iii) is performed in a batch mixer.

20. A renewed rubber composition obtainable by a method according to claim 1.

21. Method according to claim 1, wherein the method is used in the manufacture of tires, roofing material, or flooring material, or wherein the method is used in roadbuilding.

22. Method according to claim 9, wherein the high-shear mixing equipment is an extruder.

23. Method according to claim 9, wherein the mixing is performed at a speed of at least 50 rpm for a period of 1-60 minutes.

24. Method according to claim 10, wherein said moieties are selected from —C=C— and C=O.

25. Method according to claim 11, wherein F' and F" are independently selected from —C=C— and C=O, and wherein R is an alkylic or aromatic organic moiety, or any combination thereof.

26. Method according to claim 15, wherein said polymer is SBS (triblock, styrene-butadiene-styrene), SEBS (linear triblock copolymer based on styrene and ethylene/butylene) or SIS (styrene-isoprene-styrene).

27. Method according to claim 16, wherein step (iii) is performed in the presence of about 1-7 wt % branching/grafting agent.

28. Method according to claim 17, wherein steps (ii) and (iii) are performed in an extruder.

* * * * *